United States Patent [19]

Trocino

[11] 3,929,446
[45] Dec. 30, 1975

[54] SLOW NITROGEN RELEASING FERTILIZERS AND METHODS OF MAKING THE SAME

[75] Inventor: Frank S. Trocino, Eugene, Oreg.

[73] Assignee: Bohemia Inc., Eugene, Oreg.

[22] Filed: Apr. 19, 1974

[21] Appl. No.: 462,362

[52] U.S. Cl. .................. 71/23; 71/28; 71/29; 71/30; 71/33; 71/58; 71/61

[51] Int. Cl.² .................. C05F 11/00; C05C 9/00; C05B 15/00; C05G 1/02

[58] Field of Search .............. 71/23, 24, 28, 30, 61, 71/64 F, 64 G, 33, 58

[56] References Cited
UNITED STATES PATENTS

| | | |
|---|---|---|
| 2,255,027 | 9/1941 | Keenen et al. .......................... 71/30 |
| 3,239,329 | 3/1966 | Burgon .................................. 71/23 |
| 3,645,714 | 2/1972 | Heming et al. ......................... 71/23 |
| 3,781,187 | 12/1973 | Trocino ................................ 162/93 |

Primary Examiner—Charles N. Hart
Assistant Examiner—Ferris H. Lander
Attorney, Agent, or Firm—Klarquist, Sparkman, Campbell, Leigh, Hall & Whinston

[57] ABSTRACT

Wax and preferably, cork are removed from Douglas fir bark, and the residue is blended with water soluble nutrient fertilizer materials and pressed into pellets. The pellets are excellent fertilizers and release nitrogen into soil to which they are applied at optimum rates for long periods of time.

13 Claims, 2 Drawing Figures

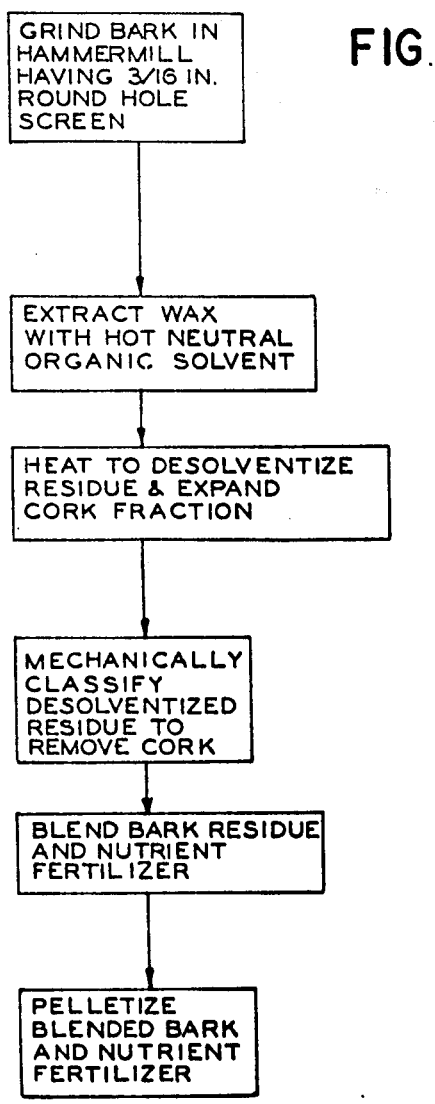
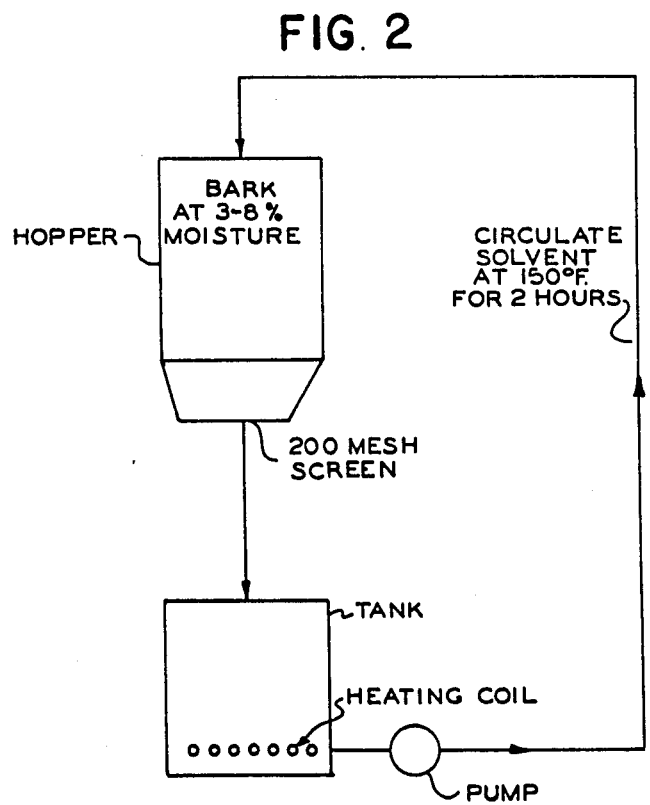
FIG. 1
FIG. 2

SLOW NITROGEN RELEASING FERTILIZERS AND METHODS OF MAKING THE SAME

BACKGROUND OF THE INVENTION

This invention relates to slow nitrogen releasing fertilizers and methods of making the same.

Heming et al. U.S. Pat. No. 3,645,714 disclosed that certain barks, namely, barks of hemlock, balsam, spruce, pine and redwood, when mixed with water soluble nutrient fertilizer materials and pelletized, formed materials which broke down sufficiently well in water to be useful as fertilizers. This patent also disclosed that unprocessed Douglas fir bark mixed with the same water soluble nutrient fertilizer materials showed such poor ability to break down in water that it was wholly unsatisfactory for use. While tests subsequent to this patent's issuance indicate that unprocessed Douglas fir bark, when mixed with urea and pelletized, works satisfactorily to release nitrogen slowly for short periods of two to three months, thereafter release falls off too fast to be satisfactory for use as a fertilizer where the nitrogen must be released for several months longer.

It is thus an object of the present invention to provide new and improved slow nitrogen releasing fertilizers and methods of making the same.

Another object of the invention is to provide slow nitrogen releasing fertilizers that release nitrogen immediately and maintain this release over a long period of time.

Another object of the invention is to provide slow nitrogen releasing fertilizers utilizing Douglas fir bark.

Another object of the invention is to provide a method of making slow nitrogen releasing fertilizers utilizing Douglas fir bark.

Summary of the Invention

I have discovered that, contrary to the teachings of the prior art, Douglas fir bark forms excellent fertilizers when wax and, preferably, cork are extracted therefrom and the residue is combined with water soluble nutrient fertilizer materials and pelletized, such fertilizers being rendered quite water-soluble and compactible into slow disintegrating pellets.

BRIEF DESCRIPTION OF THE DRAWINGS

In the drawings:

FIG. 1 is a flow diagram of a method forming one embodiment of the invention; and, FIG. 2 illustrates schematically the solvent extracting step.

DESCRIPTION OF THE PREFERRED EMBODIMENTS

Wax and, preferably, also cork are removed from Douglas fir bark to leave a fertilizer matrix of the bark residue. Methods quite suitable for removing the wax and cork are well known, for example, very satisfactory methods are disclosed and claimed in my U.S. Pat. No. 3,781,187.

In the methods described in said patent, first, Douglas fir bark is ground in a hammermill having a screen with round holes about 3/16th inch in diameter. The mixture thereby achieved is then preferably dried to between about 3 and 8 percent moisture by weight to facilitate ultimate recovery of the solvent. The mixture is then extracted with a neutral organic solvent, examples of suitable ones being hexane, benzene, the chlorinated hydrocarbons, naphthalenes, toluene and the like. The solvent is heated to a temperature of about 150 degrees F. and is percolated through the mixture of ground Douglas fir bark for about two hours, the solvent being introduced to the bark in a hopper having a 200 mesh screen at its bottom and being permitted to flow therethrough by gravity. Solvent passing through the mixture is reheated to 150 degrees F. by a heating coil in a holding tank and thereafter recirculated for the desired time. See FIG. 2. The solvent is circulated through the bark mixture so as to remove wax in an amount between about 3 and 6 percent based on the dry weight of the bark. This is approximately 60 percent of the total wax in Douglas fir bark. Removal of this much of the wax satisfactorily prepares the bark for classification and use as a fertilizer matrix as described hereinafter. A longer period of extraction would dissolve more of the wax, but I have found this unnecessary.

After the 2-hour extracting period, the bark is drained of solvent, placed in a dryer and heated to about 500 degrees F. for 2 to 4 minutes to drive off the solvent. The solvent can be condensed, recovered and reused. Desolventizing the bark causes the cork fraction to be expanded substantially in size, and the wax extracted residue can then be mechanically classified using standard classification equipment to achieve separation of the cork from the bast fiber and nonfibrous phloem fractions. The residue becomes the fertilizer matrix material of the present invention. I have found it desirable to remove 90–95 percent of the cork fraction, otherwise the pellet that is ultimately formed tends to break up physically. The phloem fraction may be removed or left in.

The matrix material of the residue bark then is combined with water-soluble nutrient fertilizer materials, which may be, for example, urea fines, liquid urea, ammonium nitrate, superphosphate or mixtures thereof, to form a fertilizer mixture, which, preferably, is then pelletized under pressure to condition and chemically combine the ingredients. In the process of pelletizing, heat is generated which causes a chemical reaction between the fertilizer and the residue bark. Thus the bark is used as a combination carrier and reactant.

The resulting pellets then are suitable for use as fertilizer and excellently fertilize soil. Removal of the cork achieves good structural integrity in the pellets and consequently, good longevity. A pellet that remains together longer, dissolves more slowly and releases nitrogen more slowly. Pellet size may be varied over a wide range, for example, from ⅛ inch to 1 inch in diameter and from ¼ inch to over 2 inches in length, and, in some instances, it may be wished to use the fertilize material in unpelletized form, in which case the user might still choose to heat the material to achieve the chemical bond above noted.

EXAMPLE 1

One hundred pounds of Douglas fir bark matrix material prepared as described above by removing the wax, cork and amorphous phloem powder, was blended with 55-½ pounds of Colliers brand agricultural grade urea in a blender. This proportion made a fertilizer with 14 percent nitrogen. The resulting mixture was then pelletized in a California laboratory type pellet m (Model CL, Type 3). The following dies were used (d hole diameter x die depth):

⅛ × ¾ inches
⅛ × 1-¼ inches
3/16 × 1 inch
3/16 × 1-½ inches
3/16 × 2 inches ps

The resulting fertilizer was compared with agricultural grade urea and urea-formaldehyde fertilizers in field tests to evaluate its slow nitrogen release characteristics and was found demonstrably superior. The comparison tests were made by an independent testing organization on test plots 1/100 of an acre in size on a level site on which was growing a uniform stand of Manhattan rye and Merton blue grass established in June 1972. The soil type was chehalis-silt loam and was excellent. The following materials were applied on Jan. 22, 1973 at a rate of 200 pounds of nitrogen per acre in one application:

Urea-bark pellets as described in this example;
Hercules brand urea-formaldehyde – 38% N; and
Colliers brand agricultural grade urea – 46% N.

The materials were applied by hand and were replicated over three plots for each fertilizer. There were also three check plots which received no nitrogen. The top one and one-half inches of leaves and stems were sampled approximately every 30 days for a period of about seven months and were analyzed for total nitrogen and nitrate nitrogen content. The turf was mechanically mowed weekly starting in April and the clippings were left on the surface. Beginning in mid-June the turf was irrigated with 1 and ½ inches of supplemental water every ten days. The following test data was obtained, the results being the average for the three plots for each fertilizer and for the check plots. Samples were taken approximately in the middle of each month.

T.N. = total nitrogen content in percent.
NO₃ = nitrate nitrogen content in p.p.m.

invention both as respects the immediate release of nitrogen and the maintenance of this release over a sustained period of time.

EXAMPLE 2

Fertilizer tests were run on a two-year old Mitchem peppermint stand on test plots 1/100 of an acre in size. The soil was classified as chehalis with streaks off Willamette with primary texture of silty-clay loam. The following materials were applied on May 14, 1973 at a rate of 200 pounds of nitrogen per acre, the materials being replicated over three plots for each fertilizer. There were also three check plots which received no nitrogen and were established as a control.

Colliers brand agricultural grade urea – 46% N;
Hercules brand urea-formaldehyde – 38% N;
Urea-bark pellets as described in Example 1;
Urea-bark pellets made with unextracted bark, but otherwise the same as the pellets of Example 1, i.e., having 14 percent nitrogen from urea; and
Urea-bark pellets made with extracted bark as in Example 1, but having 15 percent nitrogen, ½ from urea and ⅓ from ammonium nitrate in solution.

Plant tissue samples were taken before and after fertilizing at approximately 15 day intervals. The top 6 inches of the plant were taken for the samples and such included all young leaves and stems. Samples were analyzed by an independent testing laboratory for total nitrogen. Analysis of the plant tissue samples prior to fertilizing showed 1.65 percent total nitrogen and 110 p.p.m. nitrate nitrogen content.

Beginning on June 15 the field was sprinkle irrigated on a 5-day rotation with approximately 2 inches of water applied for each setting. The following test data was obtained, the results being the average for the three plots for each fertilizer and for the three check plots. Samples were taken on the dates indicated.

|  | February | | March | | April | | May | | June | | July | | August | |
|---|---|---|---|---|---|---|---|---|---|---|---|---|---|---|
|  | T.N. | NO₃ | T.N. | NO₃ | T.N. | NO₃ | T.N. | NO₃ | T.N. | NO₃ | T.N. | NO₃ | T.N. | NO₃ |
| Urea-bark pellets | 5.55 | 625 | 5.30 | 1200 | 4.40 | 960 | 4.40 | 790 | 3.85 | 650 | 3.70 | 540 | 3.75 | 570 |
| Urea-formaldehyde | 3.95 | 625 | 4.05 | 710 | 3.70 | 260 | 3.95 | 225 | 3.60 | 150 | 3.40 | 260 | 3.30 | 230 |
| Agricultural grade urea | 4.70 | 850 | 4.85 | 430 | 4.15 | 290 | 4.25 | 305 | 3.70 | 250 | 3.35 | 150 | 3.40 | 200 |
| Check plots | 3.00 | 1000 | 2.85 | 680 | 3.50 | 290 | 3.60 | 305 | 3.10 | 280 | 2.85 | 100 | 2.80 | 110 |

|  | Total Nitrogen Content in Percent | | | | |
|---|---|---|---|---|---|
|  | 6/1/73 | 6/15/73 | 7/1/73 | 7/15/73 | 8/1/73 |
| Urea-extracted bark pellets | 4.85 | 4.10 | 4.25 | 4.00 | 3.80 |
| Agricultural grade urea | 4.65 | 4.30 | 4.10 | 3.90 | 3.70 |
| Urea-unextracted bark pellets | 4.60 | 4.35 | 4.65 | 3.55 | 3.65 |
| Urea-ammonium nitrate-extracted bark pellets | 4.55 | 3.45 | 4.20 | 3.45 | 3.55 |
| Urea-formaldehyde | 4.15 | 3.10 | 3.45 | 3.05 | 3.00 |
| Check plots | 2.00 | 1.90 | 2.25 | 2.80 | 2.50 |

The test plots fertilized with the urea-bark pellets had a visual response with respect to both the other fertilized plots and the check plots which agreed with the The table indicates that the plants fertilized with the extracted bark pellets made with urea exhibited the most uniform nitrogen release characteristics over the short period of time. It is believed that this is due to the fact that the presence of wax in the unextracted bark pellets inhibits the urea from forming a chemical bond with the bark.

I claim:

1. A fertilizer product comprising a matrix material of Douglas fir bark having a substantial portion of its wax and cork removed, and a water-soluble nutrient fertilizer material blended into said matrix.

2. The fertilizer product of claim 1 wherein the Douglas fir bark has about 60 percent of its wax removed.

3. The fertilizer product of claim 1 wherein the nutrient fertilizer material is urea.

4. The fertilizer product of claim 1 wherein the nutrient fertilizer material is ammonium nitrate.

5. The fertilizer product of claim 1 wherein the nutrient fertilizer material is superphosphate.

6. The fertilizer product of claim 1 wherein the mixture of the matrix material and the nutrient fertilizer material is in pellet form.

7. The fertilizer product of claim 1 wherein the Douglas fir bark has between about 90 and 95 percent of its cork removed.

8. The method of making a fertilizer product comprising first extracting wax and then removing cork from Douglas fir bark to leave a matrix material, and then blending a water-soluble nutrient fertilizer material with said matrix material.

9. The method of claim 8 including pelletizing the blended materials.

10. The method of claim 8 including applying pressure to the blended materials to heat and combine the materials.

11. The method of claim 8 wherein the fertilizer material is primarily urea.

12. The method of claim 8 wherein the fertilizer material is primarily ammonium nitrate.

13. The method of claim 8 wherein the fertilizer material is primarily superphosphate.

* * * * *

UNITED STATES PATENT OFFICE
CERTIFICATE OF CORRECTION

PATENT NO. : 3,929,446
DATED : December 30, 1975
INVENTOR(S) : Frank S. Trocino

It is certified that error appears in the above-identified patent and that said Letters Patent are hereby corrected as shown below:

Column 3, line 6, after "inches" delete --ps--;

Column 3, line 75, after "nitro-" insert --gen sources throughout the test period. In my experience no slow nitrogen release fertilizer has ever performed like urea-bark pellets made according to this--; and Column 4, line 23, "1/2" should be --2/3--.

*Signed and Sealed this*

*twenty-third* Day of *March 1976*

[SEAL]

Attest:

RUTH C. MASON
*Attesting Officer*

C. MARSHALL DANN
*Commissioner of Patents and Trademarks*